Patented July 30, 1940

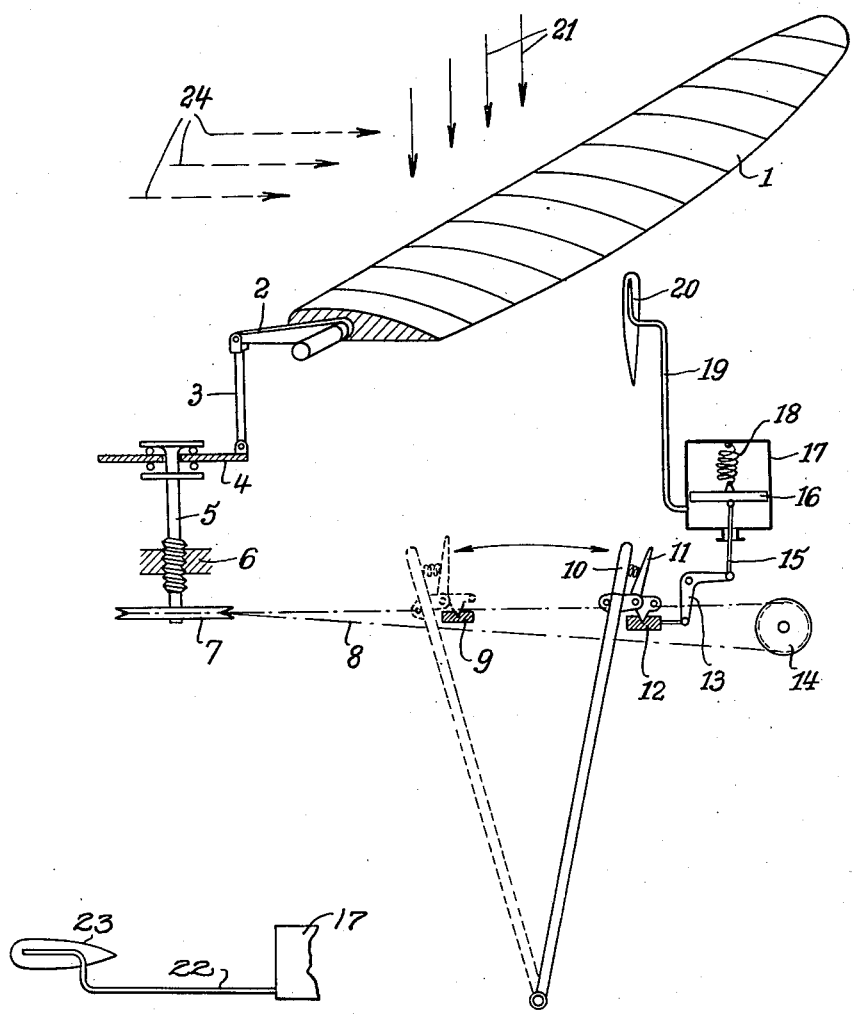

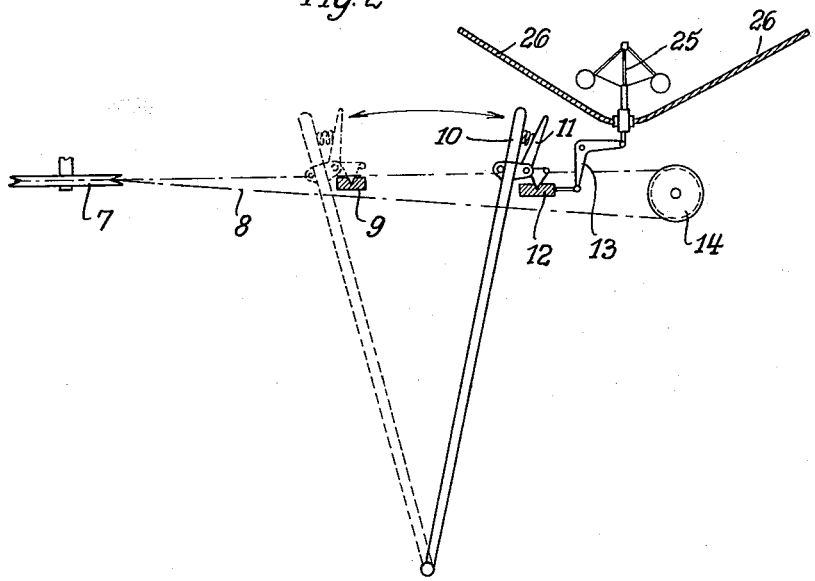
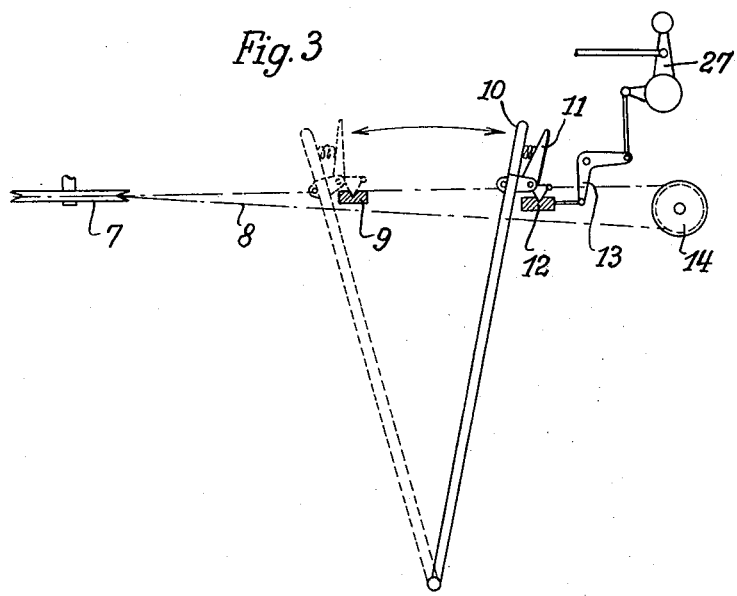

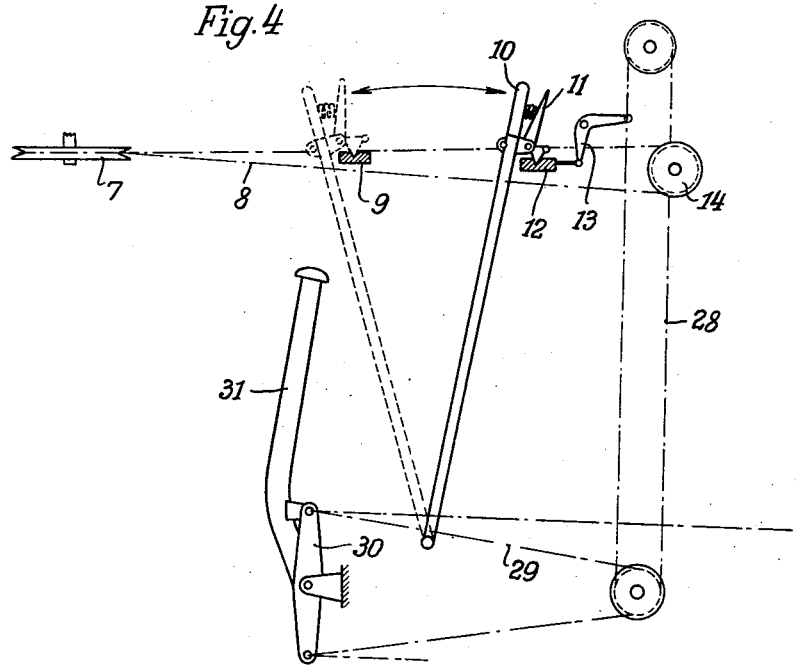
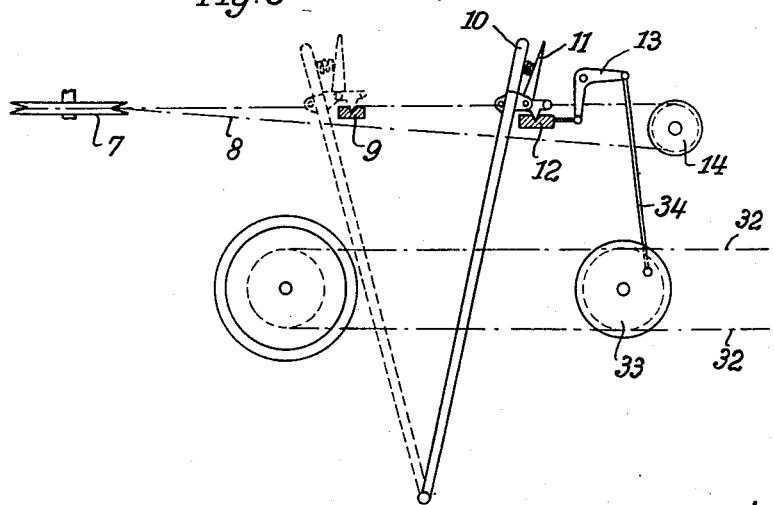

2,209,879

UNITED STATES PATENT OFFICE 2,209,879

ROTATING WING AIRCRAFT

Henrich Focke, Bremen, Germany

Application May 19, 1938, Serial No. 208,917
In Germany August 16, 1937

11 Claims. (Cl. 244—17)

This invention relates to improvements in rotating wing aircraft in which the blade-incidence of the rotor is variable.

In order to provide for the safe descent of such aircraft upon the failure of the power unit, it is known to provide means, controlled either automatically or by the pilot, for reducing the angles of incidence of the rotor blades. This is necessary because the incidence which is necessarily rather large for helicopter positions must be reduced to rotating wing conditions if an auto-rotation of the rotor and a normal gliding flight are to be ensured.

Aircraft of the kind in question with a power capacity capable of giving steep ascent and considerable forward speed, have heretofore suffered a disadvantage. This is primarily due to the necessity for having a fixed transmission ratio between the engine and rotor or rotors in order to avoid the employment of complicated driving mechanism. When there is an increase in speed of climb and forward flight the torque consumption of the rotor or rotors falls off considerably. Thus, there is a danger of the engine running up to excessive speeds during this condition, or that the engine speed will fall away during hovering flight when the torque consumption of the rotor increases. Therefore, the engine would not develop its full output just at the moment when such output is, relatively, most urgently required.

This defect is avoided by the present invention which has for its principal object to provide means whereby, during changing speed of flight, the torque consumption of the rotor or rotors is adapted to the torque output of the engine or engines when helicopter positions prevail.

A further object is to provide for an additional variation of the angle of incidence of the rotor blades, over and above that which is effected when changing over from the rotating wing condition to the helicopter position, so that the correct engine speed is always maintained.

The additional control of blade incidence may be effected manually from the pilot's seat. Or, it may be effected automatically by means sensitive to the velocity of the air stream through the screw-swept area. Alternatively, the automatic control may be effected by means sensitive to the changing conditions of forward speed of the aircraft, or by a regulator or governor responsive to speed of revolution of mechanical parts. Finally, the additional control may be interlinked with aircraft controls such as the gas throttle, the elevator control, or the fin control.

Yet another object of the invention is to provide movable securing means for the normal blade-incidence control member at one of the limit positions of its movement when changing over from rotating wing condition to helicopter position and to put this movable securing means in operative connection with one of the additional controls referred to.

Further objects and features of the invention will appear from the following description having reference to the annexed drawings, the examples therein given being merely illustrative and not restrictive. In the drawings:

Figure 1 is a diagrammatic view of a rotor (only one blade being shown) under the additional control of blade-incidence adjusting means sensitive to air speed through the blade-swept area or to dynamic pressure due to such air speed.

Figure 1a is a fragmentary view similar to Figure 1 showing a different position of the air speed sensitive means.

Figure 2 is a diagrammatic view illustrating additional blade-incidence adjusting means comprising a governor.

Figure 3 is a similar view illustrating additional blade-incidence adjusting means interlinked with gas throttle adjustment.

Figure 4 is a similar view illustrating additional blade-incidence adjusting means operated by a transmission from the joy-stick.

Figure 5 is a similar view illustrating additional blade incidence adjusting means operated by a transmission from a normal aircraft control such as the fin adjusting mechanism.

In Figure 1, the angle of incidence of the blade 1 is varied by a crank arm 2 and link 3 connected with a disc 4 having ball bearing connection with a screw spindle 5. The last-named works in a nut part 6 and carries a pulley 7 which can be turned by an endless cable 8 lapped around it and also around a return pulley 14. A hand lever 10 is engaged with the cable 8, so that by moving the lever 10, in one direction or the other through the angle indicated, the pulley 7 is turned in one direction or the other, causing the spindle 5 to rise or fall. Due to the transmission 4, 3, 2 such vertical movements of the spindle 5 produce blade rocking and change of angle of blade-incidence in known manner.

The lever 10 carries a latch or pawl 11 which can be engaged with a notch in a fixed block 9 at one limit of the angular movement, this limit corresponding with a blade setting of small angle of incidence to suit the rotating wing condition. At the opposite limit the latch 11 can be engaged with a notch in a block 12, this limit corresponding with a blade setting of increased angle of incidence to suit the helicopter position.

In accordance with the objects of the invention, the block 12 is not fixedly connected to the aircraft, but is itself also movable, say in the direction of swinging of the control lever 10. It is adjusted by means of a bell-crank lever 13 and a rod 15 connected with a piston 16 which works in a cylinder 17. The Pitot tube 20 disposed in the stream 21 of the rotor is connected to the cylinder 17 by means of the tubular passage 19. The spring 18 counteracts upward movement of the piston 16.

If now the velocity of flow through the blade swept area increases, then, due to the increasing dynamic pressure, the piston 16 moves upwardly and the block 12 travels to the right and increases the angle of the blade incidence even more than it had already been increased by the adjustment of the lever 10 from the rotating wing condition to the helicopter position. The torque taken by the lifting screw, which had fallen off due to the increase of velocity of air stream is therefore increased again. By correct selection of the adjustment movement, the size of piston and its loading spring, engine speed is maintained in spite of the changing conditions. The reverse takes place upon decrease of the velocity of air stream. If the regulating forces from the dynamic pressures in the screw stream do not suffice, naturally a suitable relay may be interposed.

The arrangement takes a form similar to that described above when the forward speed is to be utilised for the control. There is the sole difference that the Pitot tube is then disposed horizontally, as shown by 22, 23 in Figure 1a, and is directed towards the wind of travel indicated by dotted arrows at 24.

In Figure 2 the speed of revolution is employed directly for the control. A centrifugal governor 25 is provided which receives its drive through the shafts 26 from the rotors. Depending upon the speed, which thus depends upon the speed of revolution of the rotor or rotors, the adjusting member, in other words the notched block 12, is adjusted through the bellcrank lever 13 to the right or the left depending upon whether the speed of revolution of the rotors tends to increase or decrease due to increase or decrease of speed. The blade angle is varied by this adjustment and this in turn counteracts the increase or decrease of the revolution speed as the case may be.

In Figure 3, the gas throttle 27 itself is employed for the control. Since, in general, opening of the gas throttle indicates a higher speed, it follows that the object of the speed adaptation is approximately also achieved by connecting the gas throttle to the notched block 12 in such fashion that an increase in the gas simultaneously sets a larger blade angle. Here, the same effect is achieved as in Figure 2. Certainly, there is a subsidiary effect, for a larger blade angle is obtained with full gas even in the case of vertical climbing. This, however, is not undesirable, for even in this case the larger blade angle represents a better adaptation to the climbing condition.

In Figure 4 the additional control is associated with the joy stick because, generally speaking, a pressing forward of the control stick 31 means the attainment of higher speed. Consequently the notched block 12 is connected through the bell crank lever 13 and, for example, cables 28, 29 with the cross-piece 30 of the control stick 31, this moreover in such fashion that the block 12 travels to the right upon pressing forward the stick 31. Thus, here also, higher speed is accompanied by an adjustment which produces a larger blade angle. This example is only possible in the case of an aircraft without adjustment of the fixed horizontal fins.

In a machine having horizontal fin adjustment, the pilot can utilise this to achieve for himself, in the different conditions of flight, as far as possible, the same position of the control stick which is physically most comfortable for him. He will therefore make appropriate use of the fin adjustment. In such machines, the arrangement of Figure 5 is to be preferred. Here, the notched block 12 is connected to the fin adjustment 32 in such fashion that with larger angles of incidence of the fins, which is equivalent to putting the nose of the aircraft down and, therefore, to higher speed, the notched block 12 is again moved to the right and thus increases the blade angle. This may be effected by including a crank disc 33 in the control cable system 32 for the horizontal fins. This disc then drives a rod 34 which in turn adjusts the bell crank lever 13 and, therewith, also the notched block 12. In this case also, as in all the other cases, the adaptation to the speed condition for the time being is effected.

I claim:

1. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position and means for positively readjusting the position of said second means within a small range about said predetermined helicopter position, whereby the torque consumption of the rotating wing can be suited to the engine output in the helicopter condition, under variable helicopter flying conditions.

2. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a control organ associated with the engine and having a part whose position is determined by an engine condition, and means associating said part and second means for positively readjusting the position of said second means within a small range about said predetermined helicopter position in a manner to provide substantially optimum torque consumption of the rotating wing in the helicopter condition, under variable flying conditions.

3. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a control organ having a part depending for its position on the aerodynamical forces in the airstream of the rotating wing, and means under control of said part for positively readjusting the position of said second means within a small range about said predetermined helicopter position in a manner to provide substantially optimum torque consumption of the rotating wing in the helicopter condition, under variable flying conditions.

4. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a cylinder and piston arrangement, means for operating said arrangement by the dynamic pressure exerted by the air stream of the rotating wing, against a resilient counterforce forming part of said arrangement, and means under control of said arrangement for positively readjusting the position of said second means within a small range about said predetermined helicopter position in a manner to provide substantially optimum torque consumption of the rotating wing in the helicopter condition, under variable flying conditions.

5. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a cylinder and piston arrangement, means for operating said arrangement by the dynamic pressure exerted by the vertical component of the air stream of the rotating wing, against a resilient counterforce forming part of said arrangement, and means under control of said arrangement for positively readjusting the position of said second means within a small range about said predetermined helicopter position in a manner to provide substantially optimum torque consumption of the rotating wing in the helicopter condition, under variable flying conditions.

6. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a cylinder and piston arrangement, means for operating said arrangement by the dynamic pressure exerted by the horizontal component of the air stream of the rotating wing, against a resilient counterforce forming part of said arrangement, and means under control of said arrangement for positively readjusting the position of said second means within a small range about said predetermined helicopter position in a manner to provide substantially optimum torque consumption of the rotating wing in the helicopter condition, under variable flying conditions.

7. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, a control organ depending on the engine speed, and means under control of said organ for positively readjusting the position of said second means within a small range about said predetermined helicopter position in a manner to provide substantially optimum torque consumption of the rotating wing in the helicopter condition, under variable flying conditions.

8. In a rotating wing aircraft, a rotating wing with variable incidence blades, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position, means for adjusting the rate of fuel supply to the engine of the aircraft, and means under control of the said fuel supply adjusting means of the engine for positively readjusting the position of said second means within a small range about said predetermined helicopter position, whereby the torque consumption of the rotating wing can be suited to the engine output in the helicopter condition, under variable helicopter flying conditions.

9. In a rotating wing aircraft, a rotating wing with variable incidence blades, an elevator control, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position and means under control of said elevator control for positively readjusting the position of said second means within a small range about said predetermined helicopter position, whereby the torque consumption of the rotating wing can be suited to the engine output in the helicopter condition, under variable helicopter flying conditions.

10. In a rotating wing aircraft, a rotating wing with variable incidence blades, adjustable horizontal fins, a manually adjustable fin control device, hand operated means for positively setting the incidence angle of said blades to either of two predetermined positions corresponding to helicopter and autogiro conditions of the rotating wing, respectively, first means for locking and unlocking said setting means in their autogiro position, second means for locking and unlocking said setting means in their helicopter position and means whose position is dependent on the position of said fin control device for positively readjusting the position of said second means within a small range about said predetermined helicopter position, whereby the torque consumption of the rotating wing can be suited to the engine output in the helicopter condition, under variable helicopter flying conditions.

11. In a rotating wing aircraft, a rotating wing with variable incidence blades, a lever for positively setting the incidence angle of said blades to either of two predetermined positions corresponding to helicopter and autogiro conditions of the rotating wing, respectively, a stationary block including locking means for locking and unlocking said lever in its autogiro position, an adjustable block including locking means for locking and unlocking said lever in its helicopter position and means for positively readjusting the position of said adjustable block within a small range about said predetermined helicopter position, whereby the torque consumption of the rotating wing can be suited to the engine output in the helicopter condition, under variable helicopter flying conditions.

HENRICH FOCKE.